United States Patent
Reis et al.

(10) Patent No.: US 12,341,440 B2
(45) Date of Patent: Jun. 24, 2025

(54) SYSTEMS AND METHODS FOR CAPACITOR VOLTAGE CONTROL FOR INVERTER FOR ELECTRIC VEHICLE

(71) Applicant: BorgWarner US Technologies LLC, Wilmington, DE (US)

(72) Inventors: Alexandre M. S. Reis, Westfield, IN (US); Abhishek Vijay Danekar, Kokomo, IN (US); Sunil Sreedhar, Westfield, IN (US)

(73) Assignee: BorgWarner US Technologies LLC, Wilmington, DE (US)

( * ) Notice: Subject to any disclaimer, the term of this patent is extended or adjusted under 35 U.S.C. 154(b) by 220 days.

(21) Appl. No.: 18/329,144

(22) Filed: Jun. 5, 2023

(65) Prior Publication Data

US 2024/0405693 A1 Dec. 5, 2024

(51) Int. Cl.
  *H02M 7/219* (2006.01)
  *B60L 53/22* (2019.01)
  *H02M 1/00* (2006.01)
  *H02M 1/42* (2007.01)

(52) U.S. Cl.
  CPC ............ *H02M 7/219* (2013.01); *B60L 53/22* (2019.02); *H02M 1/0077* (2021.05); *H02M 1/4241* (2013.01); *B60L 2210/44* (2013.01)

(58) Field of Classification Search
  CPC .............................. H02M 7/219; B60L 53/22
  See application file for complete search history.

(56) References Cited

U.S. PATENT DOCUMENTS

| 11,043,900 B2 | 6/2021 | Backman | |
| 2013/0057200 A1* | 3/2013 | Potts | H02J 50/12 320/107 |
| 2018/0194236 A1* | 7/2018 | Elshaer | B60L 53/12 |

FOREIGN PATENT DOCUMENTS

WO 2021203735 A1 10/2021

OTHER PUBLICATIONS

Li Haoran et al: "A 6.6kW SiC bidirectional on-board charger", 2018 IEEE Applied Power Electronics Conference and Exposition (APEC), IEEE, Mar. 4, 2018 (Mar. 4, 2018), pp. 1171-1178, XP033347395.

* cited by examiner

*Primary Examiner* — Gary A Nash
(74) *Attorney, Agent, or Firm* — Joshua M. Haines; Bookoff McAndrews, PLLC

(57) ABSTRACT

A system includes: an alternating current (AC) to direct current (DC) converter (AC-DC converter) including a bulk capacitor, the AC-DC converter connectable to a line voltage; a DC to DC converter (DC-DC converter) connected to the AC-DC converter, the DC-DC converter including: one or more transformers having a secondary side connectable to a battery, and a bridge rectifier connected to the secondary side of the one or more transformers, the bridge rectifier including a bridge rectifier switch; and one or more controllers configured to control an operation of the bridge rectifier switch to control a voltage of the bulk capacitor.

20 Claims, 8 Drawing Sheets

SYSTEMS AND METHODS FOR CAPACITOR VOLTAGE CONTROL FOR INVERTER FOR ELECTRIC VEHICLE

TECHNICAL FIELD

Various embodiments of the present disclosure relate generally to systems and methods for capacitor voltage control and, more particularly, to systems and methods for capacitor voltage control in a bidirectional on-board charger or for capacitor voltage control in systems that generate an AC voltage and use a link capacitance.

BACKGROUND

An on-board charger may be a bi-directional system that converts AC voltage to DC voltage in a charging mode (grid-to-battery) and DC voltage to AC voltage in a discharge or inverter mode (battery-to-grid). An on-board charger may use a capacitor to regulate voltages. Overcharging the capacitor may damage the capacitor.

The present disclosure is directed to overcoming one or more of these above-referenced challenges.

SUMMARY OF THE DISCLOSURE

In some aspects, the techniques described herein relate to a system including: an alternating current (AC) to direct current (DC) converter (AC-DC converter) including a bulk capacitor, the AC-DC converter connectable to a line voltage; a DC to DC converter (DC-DC converter) connected to the AC-DC converter, the DC-DC converter including: one or more transformers having a secondary side connectable to a battery, and a bridge rectifier connected to the secondary side of the one or more transformers, the bridge rectifier including a bridge rectifier switch; and one or more controllers configured to control an operation of the bridge rectifier switch to control a voltage of the bulk capacitor.

In some aspects, the techniques described herein relate to a system, wherein the one or more controllers are further configured to control the operation of the bridge rectifier switch to control the voltage of the bulk capacitor in each of a pre-charging operation and a battery-to-grid operation, the pre-charging operation to transfer electrical energy from the battery to the bulk capacitor to increase the voltage of the bulk capacitor prior to the battery-to-grid operation, and the battery-to-grid operation to supply electric power from the battery to a load of the line voltage.

In some aspects, the techniques described herein relate to a system, wherein the one or more controllers are further configured to: determine a voltage setpoint for the bulk capacitor, and control the operation of the bridge rectifier switch based on the determined voltage setpoint for the bulk capacitor.

In some aspects, the techniques described herein relate to a system, wherein the one or more controllers are further configured to: determine a feedforward term, and control the operation of the bridge rectifier switch based on the determined voltage setpoint for the bulk capacitor and the determined feedforward term.

In some aspects, the techniques described herein relate to a system, wherein the one or more controllers are further configured to: determine the feedforward term based on a voltage of the battery, the determined voltage setpoint for the bulk capacitor, and a turns ratio of the one or more transformers.

In some aspects, the techniques described herein relate to a system, wherein the one or more controllers are further configured to: perform a pre-charging operation of the bulk capacitor by ramping a duty cycle of the bridge rectifier switch from 0% to 50%.

In some aspects, the techniques described herein relate to a system, wherein the one or more controllers are further configured to: end the pre-charging operation of the bulk capacitor and begin a battery-to-grid operation of the bulk capacitor when a voltage of the bulk capacitor is (i) greater than or equal to the determined voltage setpoint for the bulk capacitor or (ii) when the duty cycle of the bridge rectifier switch is equal to 50%.

In some aspects, the techniques described herein relate to a system, wherein the one or more controllers are further configured to: control the battery-to-grid operation of the bulk capacitor by determining a duty cycle of the bridge rectifier switch to maintain the voltage of the bulk capacitor at the determined voltage setpoint for the bulk capacitor.

In some aspects, the techniques described herein relate to a system, wherein the one or more controllers are further configured to: determine the duty cycle of the bridge rectifier switch to control the battery-to-grid operation of the bulk capacitor based on the feedforward term.

In some aspects, the techniques described herein relate to a system, wherein the one or more controllers are further configured to: determine a voltage difference between the determined voltage setpoint for the bulk capacitor and the voltage of the bulk capacitor, and determine the duty cycle of the bridge rectifier switch to control the battery-to-grid operation of the bulk capacitor based on a sum of the determined voltage difference and the determined feedforward term.

In some aspects, the techniques described herein relate to a system, wherein the one or more controllers are further configured to: limit one or more of the determined feedforward term or the determined duty cycle of the bridge rectifier switch to a range of values.

In some aspects, the techniques described herein relate to a system, further including: the battery connected to the DC-DC converter, wherein the system is provided as a bidirectional battery charger configured to: receive input AC power from the line voltage through the AC-DC converter, convert the AC power to DC power, and supply the DC power to the battery to charge the battery in a grid-to-battery operation, and receive DC power from the battery through the DC-DC converter, convert the DC power to AC power, and supply the AC power to a load of the line voltage as output AC power in a battery-to-grid operation.

In some aspects, the techniques described herein relate to a system, further including: an electric vehicle including the battery connected to the DC-DC converter.

In some aspects, the techniques described herein relate to a system, further including: an electric vehicle including the battery connected to the DC-DC converter, wherein the battery-to-grid operation is operable to supply electric power from the battery to an AC outlet of the electric vehicle as the load of the line voltage.

In some aspects, the techniques described herein relate to a method for controlling a system including an alternating current (AC) to direct current (DC) converter including a bulk capacitor, the AC to DC converter connectable to a line voltage; and a DC to DC converter connected to the AC to DC converter, the DC to DC converter including: one or more transformers having a secondary side connectable to a battery, and a bridge rectifier connected to the secondary side of the one or more transformers, the bridge rectifier including a bridge rectifier switch, the method including: performing, by one or more controllers, operations including: controlling an operation of the bridge rectifier switch to control a voltage of the bulk capacitor.

In some aspects, the techniques described herein relate to a method, wherein the operations further include: controlling the operation of the bridge rectifier switch to control the voltage of the bulk capacitor in each of a pre-charging operation and a battery-to-grid operation, the pre-charging operation to transfer electrical energy from the battery to the bulk capacitor to increase the voltage of the bulk capacitor prior to the battery-to-grid operation, and the battery-to-grid operation to supply electric power from the battery to a load of the line voltage.

In some aspects, the techniques described herein relate to a method, wherein the operations further include: determining a voltage setpoint for the bulk capacitor, determining a feedforward term, and controlling the operation of the bridge rectifier switch based on the determined voltage setpoint for the bulk capacitor and the determined feedforward term.

In some aspects, the techniques described herein relate to a method, wherein the operations further include: performing a pre-charging operation of the bulk capacitor by ramping a duty cycle of the bridge rectifier switch from 0% to 50%.

In some aspects, the techniques described herein relate to a method, wherein the operations further include: controlling a battery-to-grid operation of the bulk capacitor by determining a duty cycle of the bridge rectifier switch to maintain the voltage of the bulk capacitor at the determined voltage setpoint for the bulk capacitor.

In some aspects, the techniques described herein relate to a system including: one or more controllers configured to control an operation of a bridge rectifier switch to control a voltage of a bulk capacitor.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
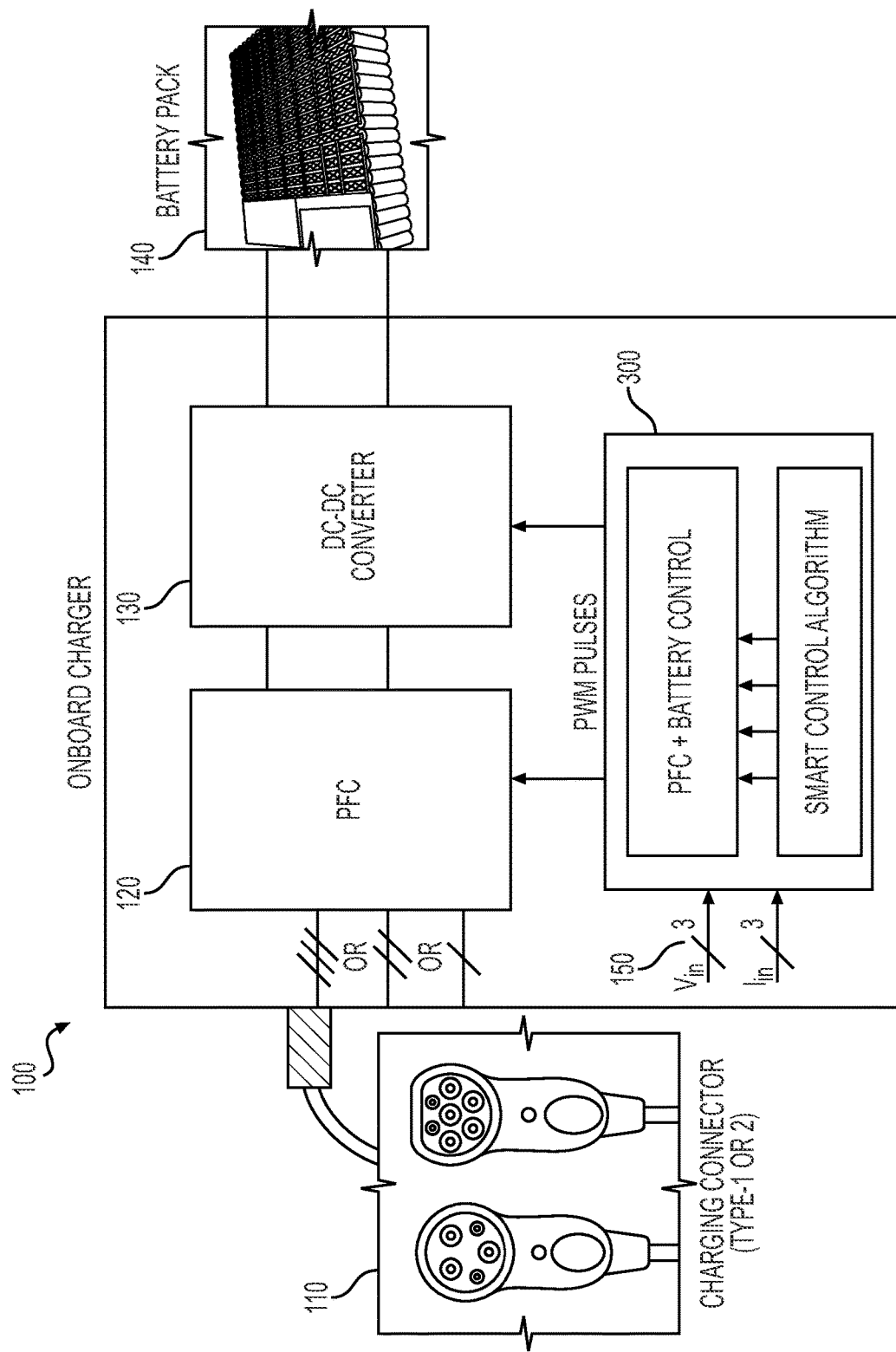
FIG. 1 depicts an exemplary system infrastructure for a battery charger, according to one or more embodiments.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

Various embodiments of the present disclosure relate generally to systems and methods for capacitor voltage control and, more particularly, to systems and methods for capacitor voltage control in a bidirectional on-board charger.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

According to one or more embodiments, a charger may operate with a single-phase or three-phase AC power source. The charger may be designed to support a wide range of HV battery voltage ranges, for example, 400V and 800V systems and maximum output power of 11 kilowatts and 22 kilowatts. A DC-DC Converter with an LLC resonant structure may be used. A PFC converter with a single-phase or three-phase power supply may be employed.

A battery charger according to the disclosure may operate with multiple types of AC input power supplies, including single phase, split/dual/two phase, and three-phase power supplies. The charger may be compatible with a wide range of configuration. An Inductor-Inductor-Capacitor (LLC) converter may be used as a second stage converter using a DC link voltage generated from the PFC as the input voltage for the converter. However, the disclosure is not limited thereto.

The input and output layout of the charger may follow automotive standards. A battery charger according to the disclosure may include a two-stage configuration, including an AC-DC power factor correction converter stage and an isolated DC-DC converter stage. The isolated DC-DC converter may include a full-bridge driver configuration with resonant tank elements to achieve better efficiency. The DC-DC converter may be designed to charge the battery from minimum voltage to maximum voltage.

A battery charger according to the disclosure may operate as a battery charger only, or operate bidirectionally for a charging operation or a power supply operation. The converter may either receive power from an AC power source and provide DC power to a battery, or receive power from the battery and provide power as an AC power source. A vehicle to grid (V2G) configuration may be achieved with a designed control strategy for single-phase, two-phase, and three-phase systems. Switches of the battery charger may be any devices, such as GTO, thyristors, or MOSFETs/IGBTs with series diodes, for example. These switches may also be mechanical components (such as relays or contactors) if sufficient failure rates and arcing conditions during operation are met. Additionally, if the switches are semi-permanent in position, the switches may be implemented as one or more jumper connectors or dual in-line package (DIP) switches.

Electric vehicles, energy storage systems, and backup generators, for example, convert electric power from one form to another. Additionally, an on-board charger for a vehicle, for example, may have a dual purpose. The on-board charger may be a bi-directional system that converts AC voltage to DC voltage in a charging mode (grid-to-battery) and DC voltage to AC voltage in a discharge or inverter mode (battery-to-grid). The charging mode may convert the grid AC into DC voltage to charge the vehicle high voltage (HV) battery, and the discharge or inverter mode may convert the HV battery DC voltage into AC voltage that may be supplied to grid line voltage, be supplied as a backup generator to power a house when the grid is down, or as an inverter to supply voltage to vehicle AC outlets, for example. The on-board charger may have a two-stage design to meet automotive requirements, with an AC-DC power factor converter in a first stage and an isolated DC-DC converter in a second stage.

In a charge mode, the AC-DC power factor converter in the first stage may convert input power from an AC grid system to a required DC bulk capacitor voltage while ensuring the AC current is within limits and the power factor is close to unity. At the start of the charge mode, the bulk capacitor may be de-energized completely, so the AC-DC power factor converter may pre-charge the bulk capacitor to avoid inrush current scenarios. When the pre-charge process is complete, the AC-DC power factor converter may operate in a fixed switching frequency and variable duty cycle mode to regulate the bulk capacitor voltage at a desired voltage setpoint and maintain unity power factor. Systems to pre-charge the bulk capacitor and limit the inrush AC current may include a positive temperature coefficient resistor, or a normal resistor, with an appropriate continuous power rating in conjunction with a high voltage relay.

During the discharge or the inverter mode, the power factor converter, operating as an inverter, may use the bulk capacitor voltage to convert DC battery voltage into a desired AC output. The AC output may vary in voltage, frequency, and/or phase type. The power factor converter may operate in different modes to generate the AC voltage depending on the phase type required.

During charge mode, the isolated DC-DC converter in the second stage may use the bulk capacitor voltage to convert AC voltage to charge the HV battery at a commanded current. The isolated DC-DC converter may be used to maintain the HV battery voltage. A resonant isolated DC-DC converter may operate with a variable switching frequency and a fixed duty cycle to regulate the HV secondary current to the desired setpoint to charge the HV battery. In the case of a resonant isolated DC-DC converter, the switching frequency may be maintained close to the resonant frequency of the converter for a more efficient operation. The LC resonant tank network may control the resonant frequency, and the frequency range along with the transformer turn ratio may determine the DC output of the isolated DC-DC converter.

During the discharge or the inverter mode of operation, the isolated DC-DC converter may use the battery voltage to charge the bulk capacitor. The resonant isolated DC-DC converter may operate in variable or fixed frequency, and variable or fixed duty cycle modes, to ensure the bulk capacitor voltage is maintained within limits at all operating conditions from no AC load to a full AC load.

The bulk capacitor in a bi-directional on-board charger for automotive applications may be in the range of millifarads. The bulk capacitor may be one or more electrolytic capacitors with higher capacitance density. A rated capacitor voltage may differ for 400V and 800V applications, for example. A series parallel combination may be used to achieve a higher rated voltage. For example, a voltage bulk capacitor HV bus, HV− to HV+, in an 800V system may vary from 360 VDC to 850 VDC. The bulk capacitor may maintain a stable link voltage during charging and inverter mode operation of the on-board charger. The isolated DC-DC converter stage may require stable input DC voltage during battery charging operation, and the PFC converter stage, operating as an inverter, may require a stable input DC voltage during inverter mode operation.

In order to allow bidirectional power flow, the isolated DC-DC converter may include active switches (such as MOSFETs, for example) in the primary and the secondary side. The isolated DC-DC converter may include a high frequency isolation transformer and a resonant tank (LC) network. In the charge mode, the isolated DC-DC converter may operate with a fixed duty cycle and variable frequency, or a fixed frequency and variable duty cycle to regulate the HV secondary current, HV battery current, to a desired setpoint in order to charge the HV battery.

In the inverter mode, the isolated DC-DC converter may maintain the bulk capacitor voltage above the peak of the desired generated AC voltage so that the PFC converter in stage 1 can continue to generate the desired AC output voltage and support the loads. The bulk capacitor voltage setpoint may be determined based on the HV battery voltage and the high frequency transformer turns ratio when the isolated DC-DC converter is operating at the resonant frequency. In the inverter mode, the isolated DC-DC converter may pre-charge the bulk capacitor to the desired voltage setpoint and regulate the bulk capacitor voltage to operate with variable loads at the AC output.

At the start of the inverter mode, the HV battery may be used to pre-charge the bulk capacitor. Until the bulk capacitor is charged to a desired setpoint, the PFC stage may be non-operational, so that the isolated DC-DC converter operates in a no-load condition. The transformer operating at no load conditions offers a higher gain, and the isolated DC-DC converter may operate at a fixed frequency and 50% duty cycle in the inverter mode, and may charge the bulk capacitor to a higher than setpoint voltage value. This overcharging may damage the bulk capacitor and/or cause an overvoltage fault that may disable the inverter operation.

During inverter mode operation, the PFC stage may provide power to a large variation in AC loads, which may cause fluctuations in the bulk capacitor voltage. When the load on the PFC is reduced while the isolated DC-DC converter operates at 50% duty cycle and fixed frequency, the bulk capacitor voltage may increase beyond the desired setpoint. The higher value of the bulk capacitor voltage may increase the switching losses in the PFC stage, and may reduce the efficiency of the inverter mode operation.

One or more embodiments may control the bulk capacitor voltage and improve the performance of the onboard charger operating in inverter mode. One or more embodiments may control the bulk capacitor voltage during the no-load condition and while PFC stage is supplying an AC load. One or more embodiments may provide a method to control the bulk capacitor voltage during no-load condition by performing a controlled pre-charge, and during load conditions by varying the duty cycle of the PWM driving the isolated DC-DC converter switches.

One or more embodiments may provide a pre-charge process of the bulk capacitor by operating the isolated DC-DC converter in a variable duty cycle and fixed switching frequency (equal to resonant frequency) mode. Based on the HV battery voltage, the duty cycle of the HV battery side switches of the isolated DC-DC converter is ramped up from 0% to 50% in a predetermined time (in seconds) and the bulk capacitor side switches of the isolated DC-DC converter are turned off, allowing the body diodes to conduct creating a diode rectifier bridge. As a result, the de-energized bulk capacitor will begin pre-charging to the desired setpoint. However, the desired bulk capacitor voltage setpoint may be reached without the duty cycle reaching 50%. One or more embodiments may provide a control mechanism to maintain the required bulk capacitor voltage.

The pre-charge process may be completed once the desired bulk capacitor setpoint is reached, and then the PFC stage may begin supplying the connected AC load. During the inverter mode operation, when the on board charger is supplying power to the AC load, the isolated DC-DC converter may calculate the duty cycle using a control loop to ensure the bulk capacitor voltage is maintained at the desired setpoint.

One or more embodiments may determine the bulk capacitor voltage setpoint based on the HV battery voltage, transformer turns ratio, and resonant tank impedance proportional to the switching frequency. One or more embodiments may use the bulk capacitor voltage setpoint and the measured bulk capacitor to determine the voltage error. One or more embodiments may use the voltage error as an input to the voltage compensator. In order to decouple the control action from the variations in the bulk capacitor voltage, one or more embodiments may determine a feedforward term based on the bulk capacitor voltage setpoint, HV battery voltage, and the transformer turns ratio.

One or more embodiments may provide a switching pattern of the secondary side (HV battery side) PWMs where the upper and lower PWM of a half bridge are phase shifted by 180 degrees. The upper and lower PWM have the same duty cycle to ensure volt-second balance of the transformer. The duty cycle of the primary side FETs (bulk capacitor side) may be the same as the secondary side FETs. One or more embodiments may provide a synchronous rectification method for a variation in transformer current. One or more embodiments may provide a compensator that may use the error in bulk capacitor voltage when compared to a reference value to determine the duty cycle of the HV DC-DC resonant converter operation. One or more embodiments may maintain a same duty cycle for upper and lower switches.

FIG. 1 depicts an exemplary system infrastructure for a battery charger, according to one or more embodiments. As shown in FIG. 1, a battery charger 100 may include or be electrically connectable to a charging connector 110. The charging connector 110 may provide an electrical connection from an external power supply to the battery charger 100, and may be a Type 1 or a Type 2 connector, for example. The charging connector 110 may transfer single phase, two-phase, or three phase power.

The battery charger 100 may include a Power Factor Correction (PFC) converter 120, an HV DC-DC converter (HVDC) 130, and a controller 300 receiving signals from input sensor 150. Power Factor Correction (PFC) converter 120 may be an AC-DC converter. HV DC-DC converter (HVDC) 130 may be a DC-DC converter. Controller 300 may include one or more controllers. The battery charger 100 may include or be electrically connectable to an HV battery 140. The battery charger 100 may be used in automotive vehicles as an onboard charger to transfer power from an external power source through charging connector 110 to HV battery 140 in a grid-to-battery operation, or to transfer power from HV battery 140 in a vehicle to grid configuration (a battery-to-grid operation). The battery charger 100 may be included in a system provided as an electric vehicle including a motor configured to rotate based on power received from the HV battery 140.

Figure 2:
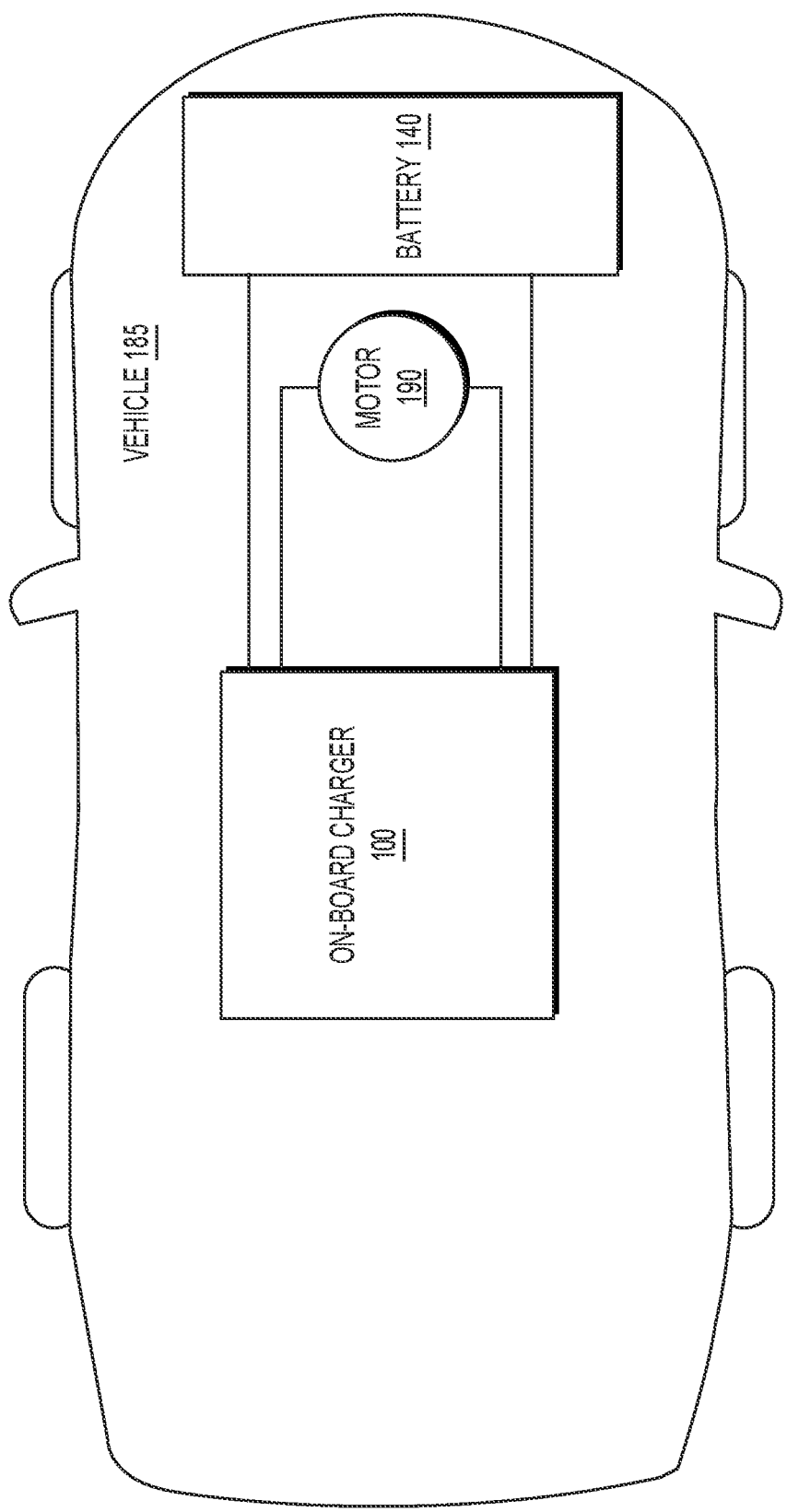
FIG. 2 depicts an exemplary system infrastructure for a vehicle including a battery charger, according to one or more embodiments.

FIG. 2 depicts an exemplary system infrastructure for a vehicle including a battery charger, according to one or more embodiments. The battery charger 100 may be a combined inverter and converter. As shown in FIG. 2, electric vehicle 185 may include battery charger 100, motor 190, and battery 140. Battery charger 100 may include components to receive electrical power from an external source and output electrical power to charge battery 140 of electric vehicle 185. Battery charger 100 may convert DC power from battery 140 in electric vehicle 185 to AC power, to drive motor 190 of the electric vehicle 185, for example, but the embodiments are not limited thereto. For example, battery charger 100 may include components to receive electrical power from an external source and output electrical power to charge battery 140 without motor 190 connected to battery charger 100. Battery charger 100 may convert DC power from battery 140 in electric vehicle 185 to AC power, to drive AC components other than motor 190 of the electric vehicle 185. Battery charger 100 may be bidirectional, and may convert DC power to AC power, or convert AC power to DC power, such as during regenerative braking, for example. Battery charger 100 may be a three-phase inverter, a single-phase inverter, or a multi-phase inverter.

Figure 3:
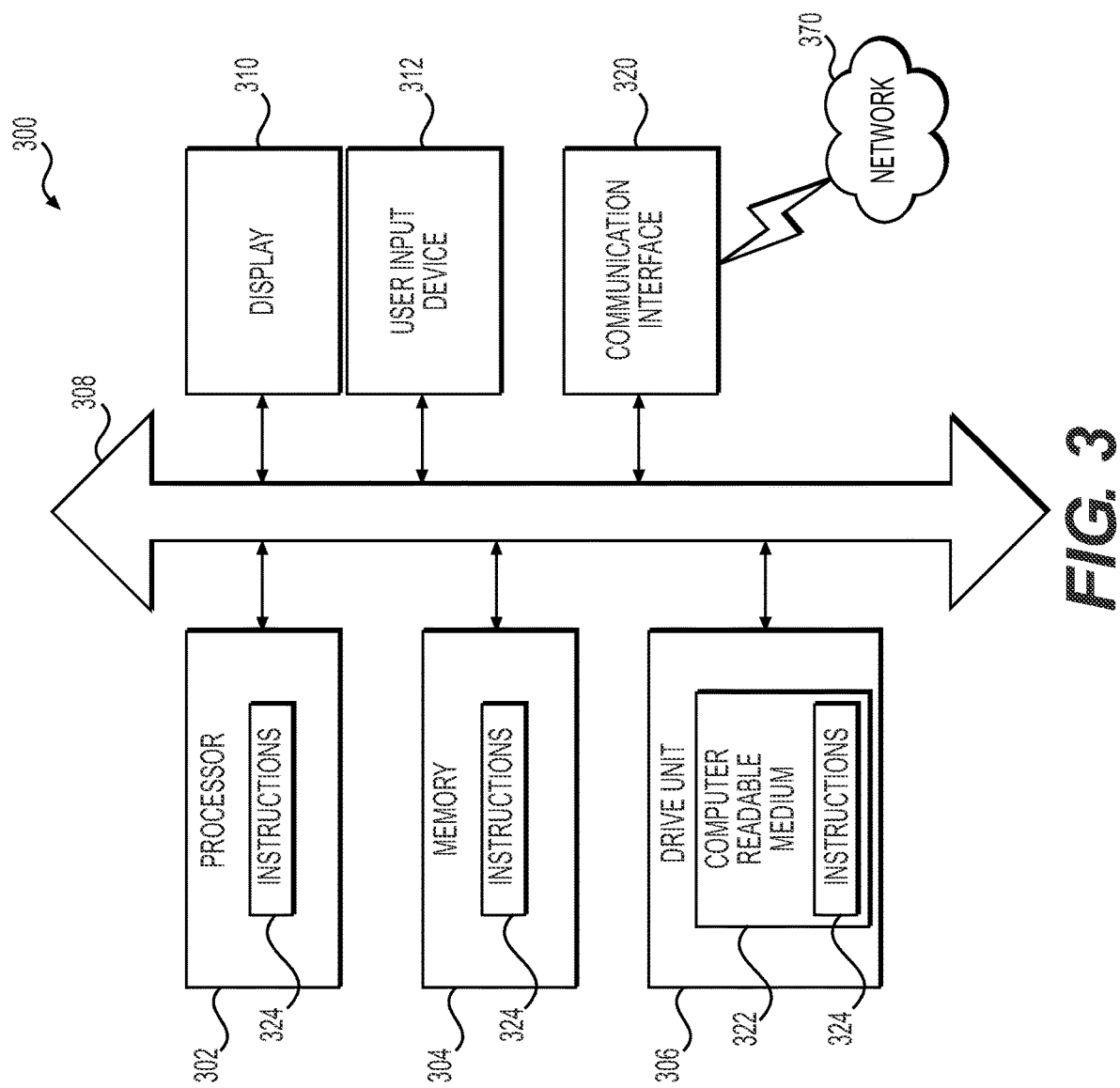
FIG. 3 depicts an implementation of a computer system that may execute techniques presented herein, according to one or more embodiments.

FIG. 3 depicts an implementation of a controller 300 that may execute techniques presented herein, according to one or more embodiments.

Any suitable system infrastructure may be put into place to allow control of the battery charger. FIG. 3 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 3. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

The controller 300 may include a set of instructions that can be executed to cause the controller 300 to perform any one or more of the methods or computer-based functions disclosed herein. The controller 300 may operate as a standalone device or may be connected, e.g., using a network, to other computer systems or peripheral devices.

In a networked deployment, the controller 300 may operate in the capacity of a server or as a client in a server-client user network environment, or as a peer computer system in a peer-to-peer (or distributed) network environment. The controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 300 can be implemented using electronic devices that provide voice, video, or data communication. Further, while the controller 300 is illustrated as a single system, the term "system" shall also be taken to include any collection of systems or sub-systems that individually or jointly execute a set, or multiple sets, of instructions to perform one or more computer functions.

As illustrated in FIG. 3, the controller 300 may include a processor 302, e.g., a central processing unit (CPU), a graphics processing unit (GPU), or both. The processor 302 may be a component in a variety of systems. For example, the processor 302 may be part of a standard computer. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the controller 300 may include an input device 312 configured to allow a user to interact with any of the components of controller 300. The input device 312 may be a number pad, a keyboard, or a cursor control device, such as a mouse, or a joystick, touch screen display, remote control, or any other device operative to interact with the controller 300.

The controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in controller 300, or combinations thereof. The connection with the network 370 may be a physical connection, such as a wired Ethernet connection or may be established wirelessly as discussed below. Likewise, the additional connections with other components of the controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
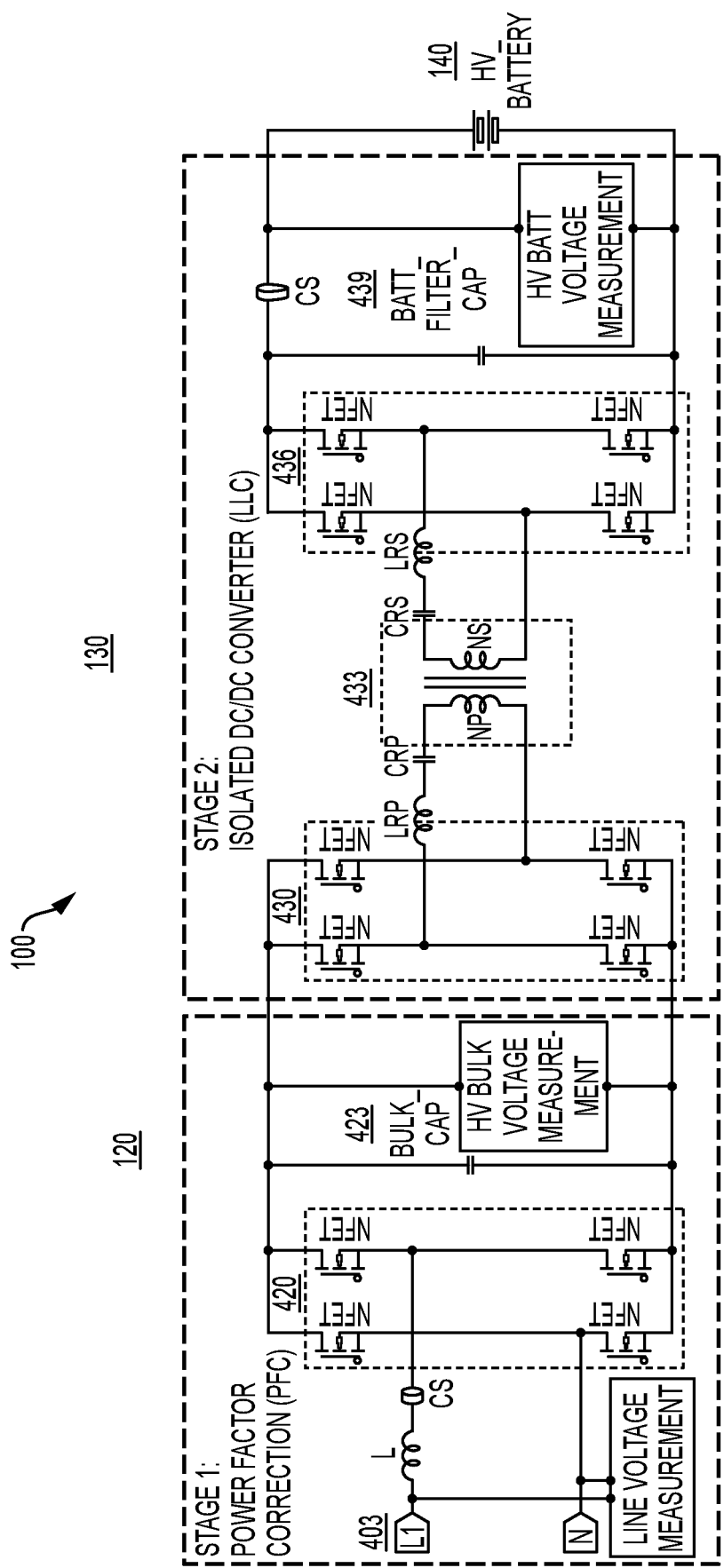
FIG. 4 depicts an exemplary electrical schematic for a single-phase battery charger with a bulk capacitor and a high voltage filter capacitor, according to one or more embodiments.

FIG. 4 depicts an exemplary electrical schematic for a single-phase battery charger with a bulk capacitor and a high voltage filter capacitor, according to one or more embodiments. As shown in FIG. 4, battery charger 100 may include PFC converter 120 and HV DC-DC converter 130. PFC converter 120 may be connected to line voltage 403, which may be a single-phase voltage, for example. HV DC-DC converter 130 may be connected to battery 140. HV DC-DC converter 130 may be operable to isolate PFC converter 120 from HV battery 140. For example, HV DC-DC converter 130 may be a CLLLC converter, or any suitable DC-DC converter.

PFC converter 120 may include PFC converter switch 420 and bulk capacitor 423. PFC converter switch 420 may be one or more switches, such as four NFET switches, for example, as shown in FIG. 4. PFC converter 120 may include other components, such as inductor L, current sensor CS, line voltage detector, and bulk capacitor voltage detector, for example.

HV DC-DC converter 130 may include bridge driver switch 430, one or more transformers 433, bridge rectifier switch 436, and HV filter capacitor 439. Bridge driver switch 430 may be one or more switches, such as four NFET switches, for example, as shown in FIG. 4. Bridge rectifier switch 436 may be one or more switches, such as four NFET switches, for example, as shown in FIG. 4. PFC converter 120 may include other components, such as primary side inductor LRP, secondary side inductor LRS, primary side capacitor CRP, secondary side capacitor CRS, current sensor CS, and battery voltage detector, for example.

The battery charger 100 may operate bidirectionally. A vehicle to grid (V2G) configuration may be achieved with a designed control strategy for multiple voltages. The PFC converter 120 may be configured to receive DC power from HV battery 140 through HV DC-DC converter 130, convert the DC power to AC power, and provide the AC power as an output to line voltage 403. The controller 300 may be designed with an algorithm to control an operation of the PFC converter 120 and HV DC-DC converter 130.

Bridge driver switch 430 may be operated as a full bridge driver or a half bridge driver, and transmit power as a square-wave signal from PFC converter 120 to one or more transformers 433. One or more transformers 433 may be one or more high-frequency transformers and may be a single transformer with multiple coils or windings, multiple transformers with single coils or windings, or any combination thereof. One or more transformers 433 may be connected to bridge rectifier switch 436. Bridge rectifier switch 436 may convert the square-wave signal to DC power.

Controller 300 may be designed with and/or configured to execute an algorithm for control of the PFC converter switch 420, bridge driver switch 430, and bridge rectifier switch 436.

Figure 5:
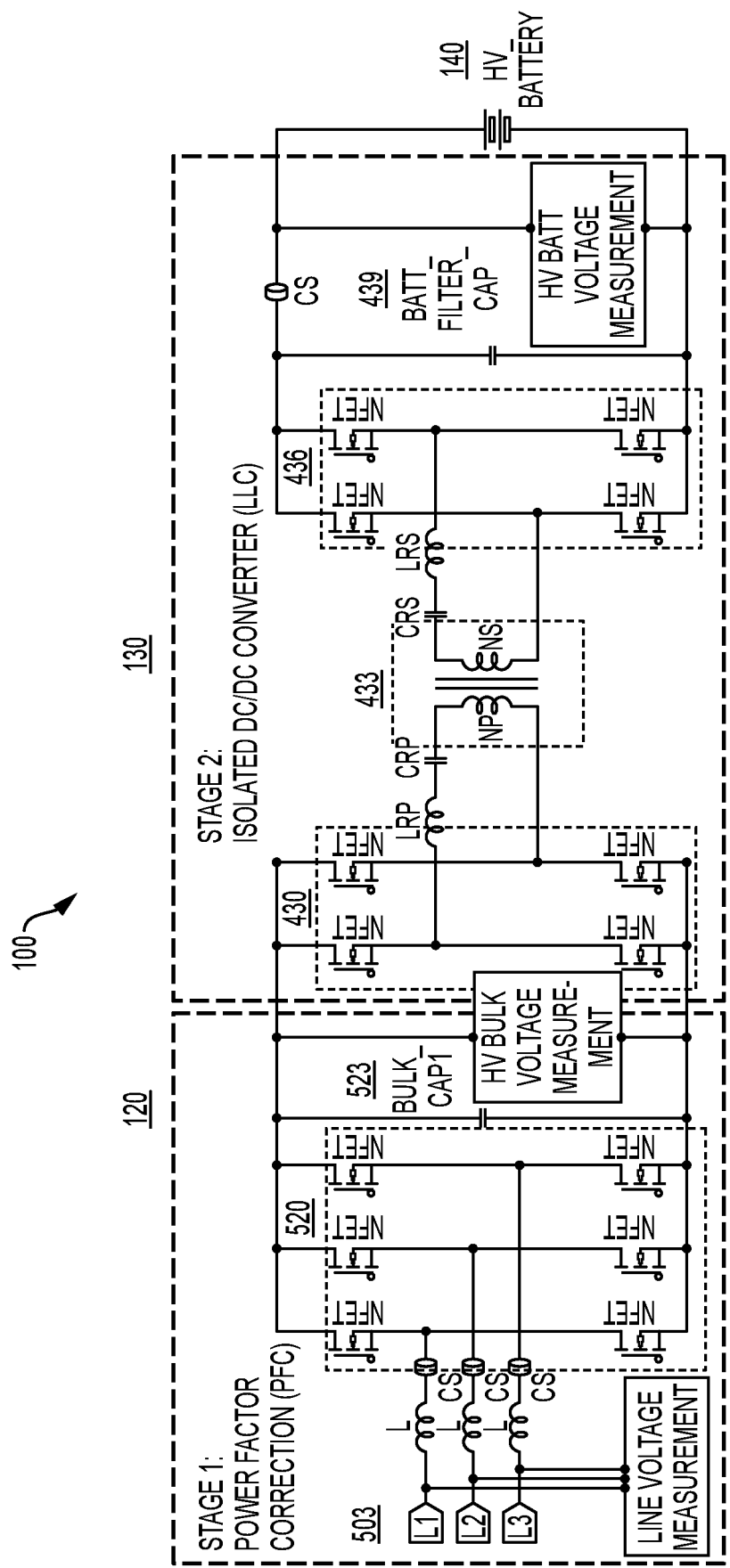
FIG. 5 depicts an exemplary electrical schematic for a three-phase battery charger with a bulk capacitor and a high voltage filter capacitor, according to one or more embodiments.

FIG. 5 depicts an exemplary electrical schematic for a three-phase battery charger with a bulk capacitor and a high voltage filter capacitor, according to one or more embodiments.

As shown in FIG. 5, battery charger 100 may include PFC converter 120 and HV DC-DC converter 130. PFC converter 120 may be connected to line voltage 503, which may be a three-phase voltage, for example. HV DC-DC converter 130 may be connected to battery 140. HV DC-DC converter 130 may be operable to isolate PFC converter 120 from HV battery 140. For example, HV DC-DC converter 130 may be a CLLLC converter, or any suitable DC-DC converter.

PFC converter 120 may include PFC converter switch 520 and bulk capacitor 523. PFC converter switch 520 may be one or more switches, such as six NFET switches, for example, as shown in FIG. 5. PFC converter 120 may include other components, such as an inductor L and current sensor CS for each input phase, line voltage detector, and bulk capacitor voltage detector, for example.

HV DC-DC converter 130 may include bridge driver switch 430, one or more transformers 433, bridge rectifier switch 436, and HV filter capacitor 439. Bridge driver switch 430 may be one or more switches, such as four NFET switches, for example, as shown in FIG. 5. Bridge rectifier switch 436 may be one or more switches, such as four NFET switches, for example, as shown in FIG. 5. PFC converter 120 may include other components, such as primary side inductor LRP, secondary side inductor LRS, primary side capacitor CRP, secondary side capacitor CRS, current sensor CS, and battery voltage detector, for example.

The battery charger 100 may operate bidirectionally. A vehicle to grid (V2G) configuration may be achieved with a designed control strategy for multiple voltages. The PFC converter 120 may be configured to receive DC power from HV battery 140 through HV DC-DC converter 130, convert the DC power to AC power, and provide the AC power as an output to line voltage 503. The controller 300 may be designed with an algorithm to control an operation of the PFC converter 120 and HV DC-DC converter 130.

Bridge driver switch 430 may be operated as a full bridge driver or a half bridge driver, and transmit power as a square-wave signal from PFC converter 120 to one or more transformers 433. One or more transformers 433 may be one or more high-frequency transformers and may be a single transformer with multiple coils or windings, multiple transformers with single coils or windings, or any combination thereof. One or more transformers 433 may be connected to bridge rectifier switch 436. Bridge rectifier switch 436 may convert the square-wave signal to DC power.

Controller 300 may be designed with and/or configured to execute an algorithm for control of the PFC converter switch 520, bridge driver switch 430, and bridge rectifier switch 436.

Figure 6:
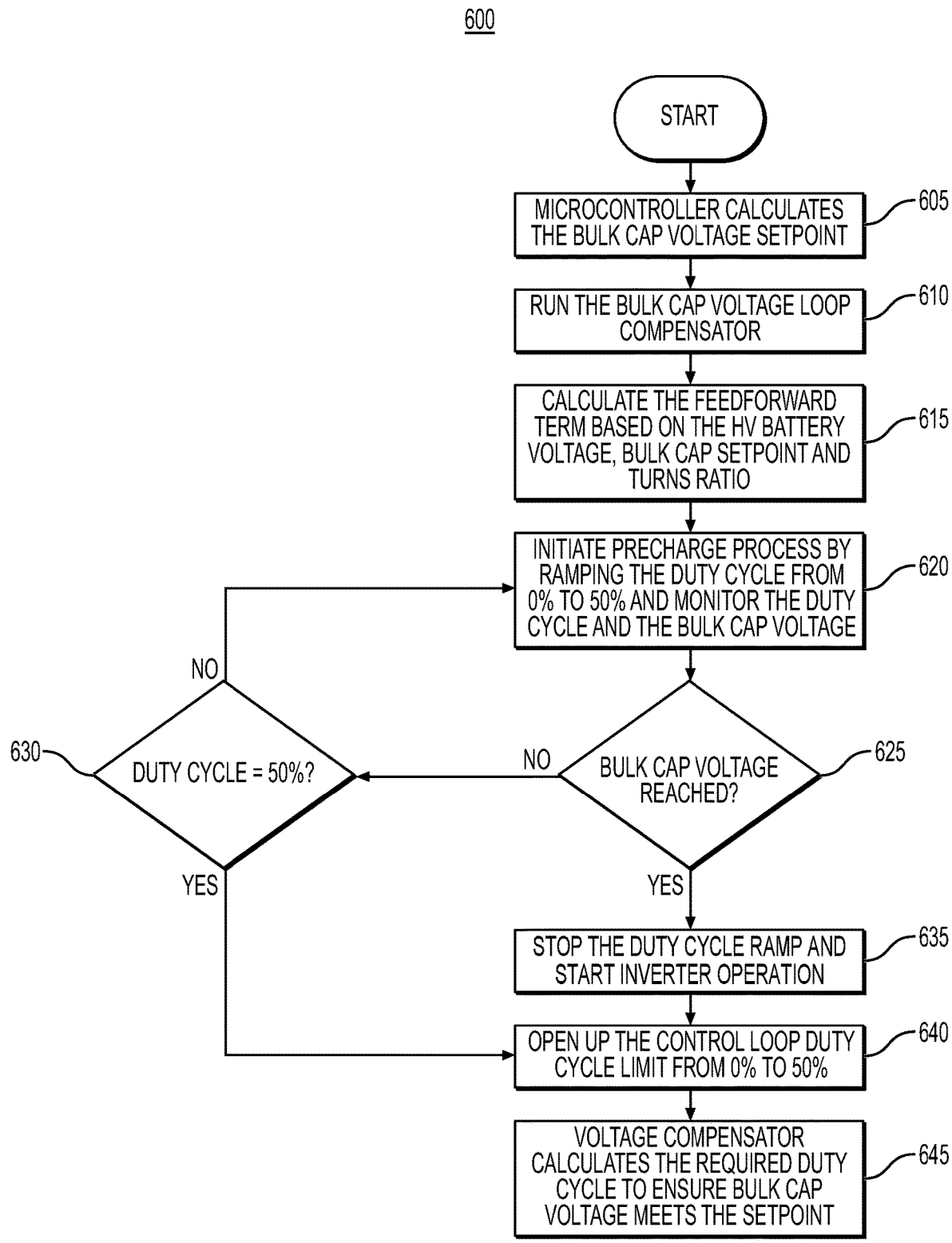
FIG. 6 depicts an exemplary method for controlling a voltage of a bulk capacitor in a pre-charge operation, according to one or more embodiments.

FIG. 6 depicts an exemplary method 600 for controlling a voltage of a bulk capacitor in a pre-charge operation, according to one or more embodiments. The pre-charge operation may be a no-load condition, where the bulk capacitor 423 may be temporarily disconnected from line voltage 403 to increase a voltage of bulk capacitor 423 to prepare for a connected load at line voltage 403. Controller 300 may determine a capacitor voltage setpoint (operation 605). For example, controller 300 may determine a capacitor voltage setpoint that is higher than line voltage 403. Controller 300 may execute a capacitor voltage loop compensation operation (operation 610). Capacitor voltage loop compensation operation may use the determined voltage setpoint and a measured voltage of bulk capacitor 423 to determine a duty cycle for bridge rectifier switch 436, as shown in voltage compensator loop 715 in FIG. 7, for example.

Controller 300 may determine a feedforward term based on a voltage of battery 140, the determined capacitor voltage setpoint from operation 605, and a turns ratio of transformer 433 (operation 615). Controller 300 may initiate the pre-charge operation by ramping a duty cycle of bridge rectifier switch 436 from 0% to 50% and monitoring the duty cycle and voltage of bulk capacitor 423 (operation 620). Here, bridge driver switch 430 may be turned off, allowing the body diodes to conduct and creating a diode rectifier bridge. As a result, the de-energized bulk capacitor 423 will begin pre-charging to the determined capacitor voltage setpoint.

Controller 300 may determine whether the voltage of bulk capacitor 523 has not reached the determined capacitor voltage setpoint from operation 605 (operation 625). When the voltage of bulk capacitor 523 has not reached the determined capacitor voltage setpoint from operation 605, controller 300 may determine whether the duty cycle has reached 50% (operation 630). When the duty cycle has not reached 50%, method 600 may continue at operation 620 to ramp the duty cycle of bridge rectifier switch 436 from 0% to 50% and monitor the duty cycle and voltage of bulk capacitor 523. For example, controller 300 may increase the duty cycle of bridge rectifier switch 436 by 0.01% every 1 ms.

In operation 625, when the voltage of bulk capacitor 523 has reached the determined capacitor voltage setpoint from operation 605 (where a voltage of the bulk capacitor is greater than or equal to the determined voltage setpoint for the bulk capacitor), controller 300 may stop the duty cycle ramp and begin the inverter operation (operation 635). Controller 300 may open the control loop duty cycle limit from 0% to 50% (operation 640). In the open inverter operation, instead of a ramped control, the duty cycle is determined based on the inputs, and may be any value between 0% and 50%. In operation 630, when the duty cycle has reached 50%, method 600 may continue to operation 640. Controller 300 may determine a required duty cycle to maintain the voltage of bulk capacitor 523 at the determined capacitor voltage setpoint from operation 605 (operation 645).

Method 600 may control a battery charger 100 including an alternating current (AC) to direct current (DC) converter (such as PFC converter 120, for example) including a bulk capacitor 423. The AC to DC converter may be connectable to a line voltage 403, and a DC to DC converter (such as HV DC-DC converter 130, for example). The DC to DC converter may include one or more transformers 433 having a secondary side connectable to a battery 140, and a bridge rectifier connected to the secondary side of the one or more transformers 433. Bridge rectifier may include bridge rectifier switch 436, which may be one or more bridge rectifier switches.

Method 600 may include performing, by one or more controllers 300, operations including controlling an operation of the bridge rectifier switch 436 to control a voltage of the bulk capacitor 423. The operations of method 600 may include controlling the operation of the bridge rectifier switch 436 to control the voltage of the bulk capacitor 423 in each of a pre-charging operation and a battery-to-grid operation. The pre-charging operation may transfer electrical energy from the battery 140 to the bulk capacitor 423 to increase the voltage of the bulk capacitor 423 prior to the battery-to-grid operation, and the battery-to-grid operation may supply electric power from the battery 140 to a load of the line voltage 403.

The operations of method 600 may include determining a voltage setpoint (such as bulk capacitor setpoint 705, for example) for the bulk capacitor 423, determining a feedforward term (such as feedforward term 745, for example), and controlling the operation of the bridge rectifier switch 436 based on the determined voltage setpoint for the bulk capacitor 423 and the determined feedforward term.

The operations of method 600 may include performing a pre-charging operation of the bulk capacitor 423 by ramping a duty cycle of the bridge rectifier switch 436 from 0% to 50%. The operations of method 600 may include controlling a battery-to-grid operation of the bulk capacitor 423 by determining a duty cycle of the bridge rectifier switch 436 to maintain the voltage of the bulk capacitor 423 at the determined voltage setpoint for the bulk capacitor 423.

Figure 7:
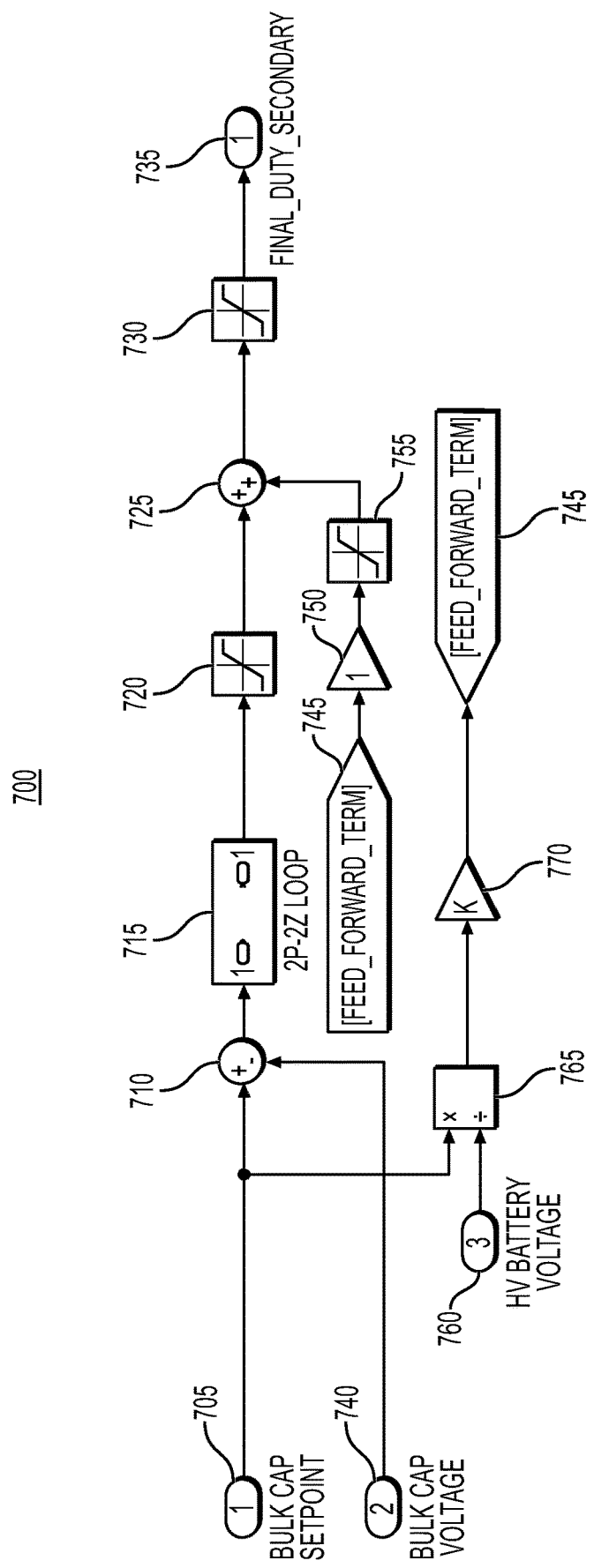
FIG. 7 depicts an exemplary system for controlling a voltage of a bulk capacitor in an inverter operation, according to one or more embodiments.

FIG. 7 depicts an exemplary system 700 for controlling a voltage of a bulk capacitor in an inverter operation, according to one or more embodiments. As shown in FIG. 7, voltage compensator system 700 may receive inputs bulk capacitor setpoint 705, bulk capacitor voltage 740, and battery voltage 760, and may provide a duty cycle 735 as an output. For example, bulk capacitor setpoint 705 may be the determined capacitor voltage setpoint from operation 605, bulk capacitor voltage 740 may be a voltage of bulk capacitor 523, and battery voltage 760 may be a voltage of battery 140. Duty cycle 735 may be the duty cycle determined in operation 645, for example.

As shown in FIG. 7, voltage compensator system 700 may determine a difference between bulk capacitor setpoint 705 and bulk capacitor voltage 740 at operator 710. This difference may be provided to voltage compensator loop 715, which may determine a duty cycle.

Operator 765 may compare bulk capacitor setpoint 705 to battery voltage 760, and provide an output through gain operator 770 as a feedforward term 745. Feedforward term 745 may pass though gain operator 750 and limiter 755 to ensure the feedforward term is within a valid range.

The determined duty cycle from voltage compensator loop 715 may pass through limiter 720 to ensure the duty cycle is within a valid range, and may be added to the feedforward term from limiter 755 at operator 725. The combined duty cycle (with the feedforward term) from operator 725 may pass through limiter 730 to ensure the combined duty cycle is within a valid range as final duty cycle 735.

At operator 710, controller 300 may determine a voltage difference between the determined voltage setpoint for the bulk capacitor and the voltage of the bulk capacitor. At operator 725, controller 300 may determine the duty cycle of the bridge rectifier switch to control the battery-to-grid operation of the bulk capacitor based on a sum of the determined voltage difference and the determined feedforward term.

Figure 8:
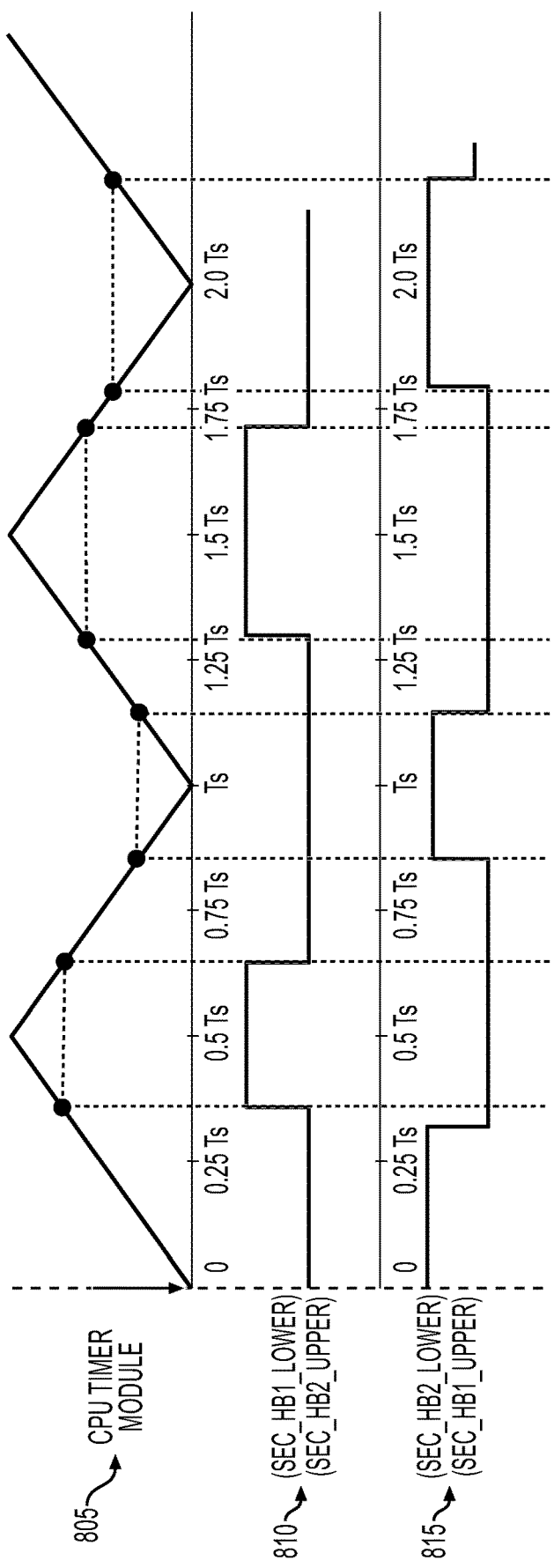
FIG. 8 depicts an exemplary plot for a voltage control of a capacitor in a control system, according to one or more embodiments.

FIG. 8 depicts an exemplary plot 800 for a voltage control of a capacitor in a control system, according to one or more embodiments. As shown in FIG. 8, controller 300 may generate a CPU timer 805 that ramps up and down with a time period Ts. Controller 300 may generate a first PWM signal 810 based on CPU timer 805, and a second PWM signal 815 based on CPU timer 805. As shown in FIG. 8, first PWM signal 810 and second PWM signal 815 may be phase shifted to provide switching signals for bridge rectifier switch 436, for example.

Controller 300 may generate a switching pattern of bridge rectifier switch 436 where the upper and lower PWM of a half bridge are phase shifted by 180 degrees. However, the disclosure is not limited thereto, and controller 300 may generate any suitable switching pattern. The upper and lower PWM have the same duty cycle to ensure voltage balance of the one or more transformers 433. The duty cycle of the bridge driver switch 430 may be the same as the bridge rectifier switch 436. Controller 300 may provide a synchronous rectification method for a variation in transformer current. Controller 300 may provide a compensator that may use the error in bulk capacitor voltage when compared to a reference value to determine the duty cycle of the HV DC-DC resonant converter operation.

One or more embodiments may control the bulk capacitor voltage and improve the performance of the on board charger operating in inverter mode. One or more embodiments may control the bulk capacitor voltage during the no-load condition and while PFC stage is supplying a load.

One or more embodiments may provide a method to control the bulk capacitor voltage during no-load condition by performing a controlled pre-charge, and during load conditions by varying the duty cycle of the PWM driving the isolated DC-DC converter switches.

One or more embodiments may provide a pre-charge process of the bulk capacitor by operating the isolated DC-DC converter in a variable duty cycle and fixed switching frequency (equal to resonant frequency) mode. One or more embodiments may provide a control mechanism to maintain the required bulk capacitor voltage.

One or more embodiments may determine the bulk capacitor voltage setpoint based on the HV battery voltage, transformer turns ratio, and resonant tank impedance proportional to the switching frequency. One or more embodiments may use the bulk capacitor voltage setpoint and the measured bulk capacitor to determine the voltage error. One or more embodiments may use the voltage error as an input to the voltage compensator. In order to decouple the control action from the variations in the bulk capacitor voltage, one or more embodiments may determine a feedforward term based on the bulk capacitor voltage setpoint, HV battery voltage, and the transformer turns ratio.

One or more embodiments may provide a switching pattern of the secondary side (HV battery side) PWMs where the upper and lower PWM of a half bridge are phase shifted by 180 degrees. One or more embodiments may provide a synchronous rectification method for a variation in transformer current. One or more embodiments may provide a compensator that may use the error in bulk capacitor voltage when compared to a reference value to determine the duty cycle of the HV DC-DC resonant converter operation.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:
    an alternating current (AC) to direct current (DC) converter (AC-DC converter) including a bulk capacitor, the AC-DC converter connectable to a line voltage;
    a DC to DC converter (DC-DC converter) connected to the AC-DC converter, the DC-DC converter including:
        one or more transformers having a secondary side connectable to a battery, and
        a bridge rectifier connected to the secondary side of the one or more transformers, the bridge rectifier including a bridge rectifier switch; and
    one or more controllers configured to:
        control an operation of the bridge rectifier switch to control a voltage of the bulk capacitor;
        determine a feedforward term; and
        control the operation of the bridge rectifier switch based on a voltage setpoint for the bulk capacitor and the determined feedforward term.

2. The system of claim 1, wherein the one or more controllers are further configured to control the operation of the bridge rectifier switch to control the voltage of the bulk capacitor in each of a pre-charging operation and a battery-to-grid operation, the pre-charging operation to transfer electrical energy from the battery to the bulk capacitor to increase the voltage of the bulk capacitor prior to the battery-to-grid operation, and the battery-to-grid operation to supply electric power from the battery to a load of the line voltage.

3. The system of claim 2, further comprising:
    an electric vehicle including the battery connected to the DC-DC converter,
    wherein the battery-to-grid operation is operable to supply electric power from the battery to an AC outlet of the electric vehicle as the load of the line voltage.

4. The system of claim 1, wherein the one or more controllers are further configured to:
    determine a voltage setpoint for the bulk capacitor.

5. The system of claim 4, wherein the one or more controllers are further configured to:
    determine the feedforward term based on a voltage of the battery, the determined voltage setpoint for the bulk capacitor, and a turns ratio of the one or more transformers.

6. The system of claim 5, wherein the one or more controllers are further configured to:
    perform a pre-charging operation of the bulk capacitor by ramping a duty cycle of the bridge rectifier switch from 0% to 50%.

7. The system of claim 6, wherein the one or more controllers are further configured to:
    end the pre-charging operation of the bulk capacitor and begin a battery-to-grid operation of the bulk capacitor when a voltage of the bulk capacitor is (i) greater than or equal to the determined voltage setpoint for the bulk capacitor or (ii) when the duty cycle of the bridge rectifier switch is equal to 50%.

8. The system of claim 7, wherein the one or more controllers are further configured to:
    control the battery-to-grid operation of the bulk capacitor by determining a duty cycle of the bridge rectifier switch to maintain the voltage of the bulk capacitor at the determined voltage setpoint for the bulk capacitor.

9. The system of claim 8, wherein the one or more controllers are further configured to:
    determine the duty cycle of the bridge rectifier switch to control the battery-to-grid operation of the bulk capacitor based on the feedforward term.

10. The system of claim 9, wherein the one or more controllers are further configured to:
    determine a voltage difference between the determined voltage setpoint for the bulk capacitor and the voltage of the bulk capacitor, and
    determine the duty cycle of the bridge rectifier switch to control the battery-to-grid operation of the bulk capacitor based on a sum of the determined voltage difference and the determined feedforward term.

11. The system of claim 10, wherein the one or more controllers are further configured to:
    limit one or more of the determined feedforward term or the determined duty cycle of the bridge rectifier switch to a range of values.

12. The system of claim 1, further comprising:
    the battery connected to the DC-DC converter,
    wherein the system is provided as a bidirectional battery charger configured to:
        receive input AC power from the line voltage through the AC-DC converter,
        convert the AC power to DC power, and supply the DC power to the battery to charge the battery in a grid-to-battery operation, and
        receive DC power from the battery through the DC-DC converter, convert the DC power to AC power, and supply the AC power to a load of the line voltage as output AC power in a battery-to-grid operation.

13. The system of claim 1, further comprising:
an electric vehicle including the battery connected to the DC-DC converter.

14. A method for controlling a system including an alternating current (AC) to direct current (DC) converter including a bulk capacitor, the AC to DC converter connectable to a line voltage; and a DC to DC converter connected to the AC to DC converter, the DC to DC converter including: one or more transformers having a secondary side connectable to a battery, and a bridge rectifier connected to the secondary side of the one or more transformers, the bridge rectifier including a bridge rectifier switch, the method comprising:
performing, by one or more controllers, operations including:
controlling an operation of the bridge rectifier switch to control a voltage of the bulk capacitor;
determining a feedforward term; and
controlling the operation of the bridge rectifier switch based on a voltage setpoint for the bulk capacitor and the determined feedforward term.

15. The method of claim 14, wherein the operations further include:
controlling the operation of the bridge rectifier switch to control the voltage of the bulk capacitor in each of a pre-charging operation and a battery-to-grid operation, the pre-charging operation to transfer electrical energy from the battery to the bulk capacitor to increase the voltage of the bulk capacitor prior to the battery-to-grid operation, and the battery-to-grid operation to supply electric power from the battery to a load of the line voltage.

16. The method of claim 14, wherein the operations further include:
determining the voltage setpoint for the bulk capacitor.

17. The method of claim 16, wherein the operations further include:
performing a pre-charging operation of the bulk capacitor by ramping a duty cycle of the bridge rectifier switch from 0% to 50%.

18. The method of claim 16, wherein the operations further include:
controlling a battery-to-grid operation of the bulk capacitor by determining a duty cycle of the bridge rectifier switch to maintain the voltage of the bulk capacitor at the determined voltage setpoint for the bulk capacitor.

19. A system comprising:
one or more controllers configured to:
control an operation of a bridge rectifier switch to control a voltage of a bulk capacitor;
determine a feedforward term; and
control the operation of the bridge rectifier switch based the determined feedforward term.

20. The system of claim 19, wherein the one or more controllers are further configured to:
determine the feedforward term based on a voltage of a battery, a determined voltage setpoint for the bulk capacitor, and a turns ratio of one or more transformers.

* * * * *

UNITED STATES PATENT AND TRADEMARK OFFICE
CERTIFICATE OF CORRECTION

| | | |
|---|---|---|
| PATENT NO. | : 12,341,440 B2 | Page 1 of 1 |
| APPLICATION NO. | : 18/329144 | |
| DATED | : June 24, 2025 | |
| INVENTOR(S) | : Alexandre M. S. Reis et al. | |

It is certified that error appears in the above-identified patent and that said Letters Patent is hereby corrected as shown below:

In the Claims

Column 18, Line 9, Claim 4, delete "a" and insert --the--.

Column 20, Line 23, Claim 19, after "based" insert --on--.

Signed and Sealed this
Twenty-sixth Day of August, 2025

Coke Morgan Stewart
*Acting Director of the United States Patent and Trademark Office*